United States Patent
Tsukamoto et al.

(10) Patent No.: US 9,868,091 B2
(45) Date of Patent: Jan. 16, 2018

(54) TRANSVERSE-MOUNTED MEMBRANE FILTRATION APPARATUS

(71) Applicant: Metawater Co., Ltd., Tokyo (JP)

(72) Inventors: Junpei Tsukamoto, Tokyo (JP); Shinichi Sakata, Tokyo (JP)

(73) Assignee: Metawater Co., Ltd., Tokyo (JP)

( * ) Notice: Subject to any disclaimer, the term of this patent is extended or adjusted under 35 U.S.C. 154(b) by 621 days.

(21) Appl. No.: 14/493,564

(22) Filed: Sep. 23, 2014

(65) Prior Publication Data

US 2015/0008175 A1    Jan. 8, 2015

Related U.S. Application Data (63) Continuation of application No. PCT/JP2013/059116, filed on Mar. 27, 2013.

(30) Foreign Application Priority Data

Mar. 27, 2012 (JP) .................................. 2012-072185

(51) Int. Cl.
   *B01D 65/08*  (2006.01)
   *B01D 65/02*  (2006.01)
   (Continued)

(52) U.S. Cl.
   CPC .............. *B01D 71/02* (2013.01); *B01D 63/08* (2013.01); *B01D 65/02* (2013.01); *B01D 65/08* (2013.01);
   (Continued)

(58) Field of Classification Search
   CPC ........ B01D 61/08; B01D 61/18; B01D 63/02; B01D 63/10; B01D 65/02; B01D 65/08;
   (Continued)

(56) References Cited

U.S. PATENT DOCUMENTS

| | | | |
|---|---|---|---|
| 5,494,577 A | 2/1996 | Rekers | |
| 2011/0127206 A1* | 6/2011 | Meyer-Blumenroth | B01D 63/043 210/232 |

FOREIGN PATENT DOCUMENTS

| | | |
|---|---|---|
| JP | H04-98401 U | 8/1992 |
| JP | H11-333490 A | 12/1999 |
| JP | 2009-136777 A | 6/2009 |
| JP | 2009220070 | * 10/2009 |

OTHER PUBLICATIONS

English language machine translation of JP2009-220070, No Date, 21 pages.*

(Continued)

*Primary Examiner* — Pranav Patel
(74) *Attorney, Agent, or Firm* — Burr & Brown, PLLC (57) ABSTRACT

A transverse-mounted membrane filtration apparatus includes an air diffuser device including a shelf-shaped member and a gas-feeding unit, the shelf-shaped member including a plurality of shelf boards being arranged in a flow path segment at an immediate upstream of an end surface of a membrane element with a predetermined distance from the end surface of the membrane element and covering an entire flow path of the membrane element along a vertical direction, the gas-feeding unit feeding a gas to the raw water for washing the membrane element through a gas-feeding port provided at a bottom portion of a flow path of the shelf-shaped member. Herein a shelf board at a lowermost position of the shelf-shaped member is inclined toward a side of the end surface of the membrane element in a vertically upper direction.

5 Claims, 4 Drawing Sheets

(51) Int. Cl.
- *B01D 71/02* (2006.01)
- *C02F 1/44* (2006.01)
- *B01D 63/08* (2006.01)
- B01D 63/10 (2006.01)
- C02F 3/12 (2006.01)

(52) U.S. Cl.
CPC ............... *C02F 1/44* (2013.01); *C02F 1/444* (2013.01); *B01D 2321/185* (2013.01); *C02F 3/1268* (2013.01); *C02F 2303/16* (2013.01); *Y02W 10/15* (2015.05)

(58) Field of Classification Search
CPC ............ B01D 2313/26; B01D 2313/10; B01D 2313/105; B01D 2313/08; B01D 2313/086; B01D 2313/12; B01D 2313/125; B01D 2321/02; B01D 2321/18; B01D 2321/185; C02F 2303/20
See application file for complete search history.

(56) References Cited

OTHER PUBLICATIONS

English language machine translation of JP2009-136777 (Also Published as JP5251097), No Date, 17 pages.*
International Search Report (With English Translation), International Application No. PCT/JP2013/059116, dated Jun. 11, 2013 (5 pages).
Extended European Search Report (Application No. 13768621.8) dated Nov. 5, 2015.

* cited by examiner

TRANSVERSE-MOUNTED MEMBRANE FILTRATION APPARATUS

CROSS-REFERENCE TO RELATED APPLICATIONS

This application is a continuation of PCT International Application No. PCT/JP2013/059116 filed on Mar. 27, 2013 which claims the benefit of priority from Japanese Patent Application No. 2012-072185 filed on Mar. 27, 2012, the entire contents of which are incorporated herein by reference.

BACKGROUND OF THE INVENTION

1. Field of the Invention

The present invention relates to a transverse-mounted membrane filtration apparatus to which an air diffusion device removing fouling substances from a membrane element such as ceramics or the like is attached.

2. Description of the Related Art

Active sludge treatment of wastewater is a process of making active sludge absorb biochemical oxygen demand (BOD) of wastewater in an aeration tank, causing the treated water fed from the aeration tank to be subjected to a solid-liquid separation in the precipitation tank by gravity settling, and collecting supernatant liquid as treated water. However the process of solid-liquid separation making use of gravity settling takes a lot of time, and in some cases, a solid-liquid separation is impossible because of bulking (of sludge) depending on the quality of water in the tank.

Based on such background, an immersed-membrane-bioreactor method is proposed for conducting solid-liquid separation in which a membrane module, in a casing of which a membrane element such as ceramic or the like is loaded, is immersed in wastewater in an aeration tank, and filtering the wastewater in the aeration tank directly (see Japanese Laid-open Patent Publication No. H11-333490). This method is capable of solid-liquid separation without consuming a lot of time and is regardless of the quality of the water in the tank. However, the method requires a great deal of labor because the membrane module is immersed in the wastewater in the aeration tank, and thus the water in the aeration tank must be drained fully when maintaining the membrane module.

To address this, a method is proposed in recent years in which cross-flow filtration of wastewater in an aeration tank is conducted by making use of a membrane module disposed outside the aeration tank. In this method, the wastewater in the aeration tank is fed to a membrane module disposed outside by making use of a pump, and the cross-flow filtration is conducted to the wastewater by the membrane module to collect filtrate water being filtered through a membrane surface formed as a flow-path's inner periphery of the membrane element as treated water and meanwhile to return wastewater not having been filtered through the membrane surface to the aeration tank as concentrated water.

SUMMARY OF THE INVENTION

It is an object of the present invention to at least partially solve the problems in the conventional technology.

A transverse-mounted membrane filtration apparatus according to the present invention includes: a membrane module; an inlet pipe through which a raw water flows to the membrane module, the raw water flowing in a flow path of a membrane element of the membrane module in an approximately horizontal direction; and an air diffuser device including a shelf-shaped member and a gas-feeding unit, the shelf-shaped member including a plurality of shelf boards being arranged in a flow path segment at an immediate upstream of an end surface of the membrane element with a predetermined distance from the end surface of the membrane element and covering the entire flow path of the membrane element along a vertical direction, the gas-feeding unit feeding a gas to the raw water for washing the membrane element through a gas-feeding port provided at a bottom portion of a flow path of the shelf-shaped member. Herein a shelf board at a lowermost position of the shelf-shaped member is inclined toward a side of the end surface of the membrane element in a vertically upper direction so that the shelf board at the lowermost position of the shelf-shaped board member along a vertical direction disperses the air blown out from the gas-feeding port into an air to be forced into a flow path of a lower region of the end surface of the membrane element by a predetermined ratio through a gap between the shelf-shaped member and the end surface of the membrane element and an air to be detoured from an upstream side of the shelf-shaped member and forced into a flow path of an upper region of a rest of the end surface of the membrane element.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Hereinafter, embodiments of the present invention will be described with reference to the drawings. In all the drawings for an embodiment below, identical or equivalent elements are given same reference numerals. The present invention is not limited to an embodiment which will be explained hereafter.

In a case of filtering wastewater by using a membrane module, fouling (clogging of the membrane) occurs along with an elapse of operation time. When a fouling occurs, it is preferable to restrain the fouling as much as possible from occurring because the membrane module must be washed or replaced. To address this, the inventors of the present application studied a method of admixing air into wastewater fed to the membrane module to remove the fouling substances adhering the membrane surface by making use of a shear of air in the wastewater.

As a result of the study, the inventors found that the method is effective in a case where wastewater is fed to the membrane module in a direction which is in parallel with a vertical direction, in other words, in a case where the membrane surface is in parallel with the vertical direction, and found that, on the other hand, the method results in malfunction in a case where wastewater is fed in a direction which is approximately in parallel with a horizontal direction, in other words, in a case where the membrane surface is approximately in parallel with the horizontal direction. That is, the inventors found that, in a case where the wastewater is fed in the direction which is approximately in parallel with the horizontal direction, air cannot be fed to the entire end surface of the membrane element uniformly because the air exists at an upper potion side of a wastewater piping unevenly.

In contrast, according to the embodiment described below, it is possible to provide an advantage that a transverse-mounted membrane filtration apparatus in which a membrane module capable of feeding air uniformly to the entire end surface of the membrane element is disposed.

Figure 1:
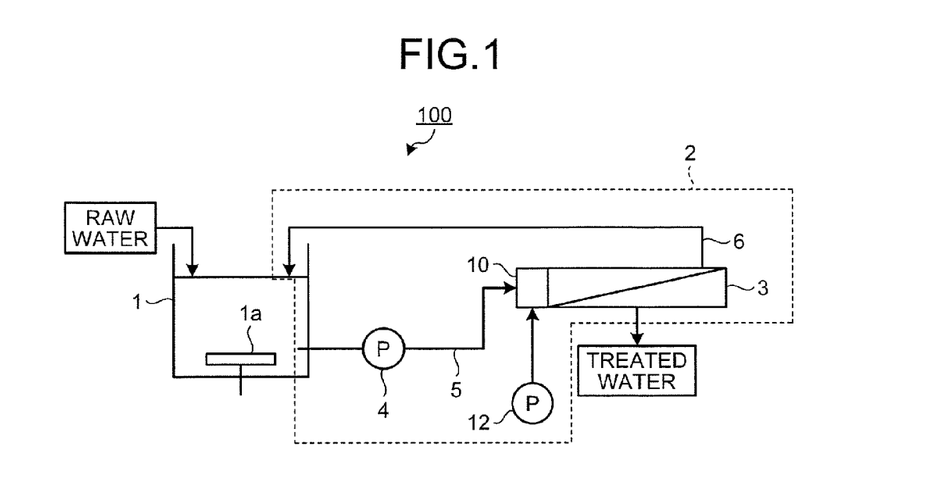
FIG. 1 is a schematic diagram illustrating a configuration of a membrane filtration system to which a transverse-mounted membrane filtration apparatus as an embodiment of the present invention is applied.

A transverse-mounted membrane filtration apparatus according to an embodiment of the present invention will be explained. FIG. 1 is a schematic diagram illustrating a configuration of a membrane filtration system to which the transverse-mounted membrane filtration apparatus according to the embodiment of the present invention is applied.

As shown in FIG. 1, a membrane filtration system 100 to which the transverse-mounted membrane filtration apparatus according to the embodiment is applied includes an aeration tank 1 and a transverse-mounted membrane filtration apparatus 2. The aeration tank 1 includes an air-diffusing portion 1a in which raw water such as sewage, human waste, and industrial wastewater or the like fed to the aeration tank 1 is aerated by air as gas.

The transverse-mounted membrane filtration apparatus 2 includes a ceramic membrane module 3 as a membrane module, an air diffuser device 10 connected to an inlet side, into which the raw water flows, of the ceramic membrane module 3, an inlet pipe 5 through which the raw water fed from the aeration tank 1 is flown into the ceramic membrane module 3 by a pump 4, a re-introducing pipe 6 through which concentrated water flowing out from the ceramic membrane module 3 is returned to the aeration tank 1, and an air pump device 12 feeding air as a gas to the air diffuser device 10, and the raw water flows in a flow path of a ceramic membrane element 3a of the ceramic membrane module 3 in an approximately horizontal direction. The membrane module may be a membrane element loaded in a casing having a raw water inlet, a filtrate water outlet, and a concentrated water outlet. Although the membrane to be loaded may not be limited in particular form and material, it is preferable to use, for example, a monolithic ceramic membrane, or a tubular ceramic membrane being formed as a column-shaped porous ceramic body and having a through hole of which inner diameter is within a range of 1.0 to 10 mm, and an inner periphery of the through hole is a micro filtration membrane of which pore diameter is 0.1 μm, or a tubular polymer membrane or the like.

In the membrane filtration system 100, air is fed to the raw water in the aeration tank 1 from the air-diffusing portion 1a, and the raw water containing an organic component is subjected to an active sludge treatment in the aeration tank 1. A part of the raw water in the aeration tank 1 is fed by the pump 4 from a side at which the air diffuser device 10 is disposed to the ceramic membrane module 3. Filtrate water filtrated through a membrane surface of the flow path of the ceramic membrane element 3a of the ceramic membrane module 3 is collected as treated water, and concentrated water not having been filtrated through the membrane surface is returned to the aeration tank 1 through the re-introducing pipe 6.

The membrane filtration system 100 configured as above includes the air diffuser device 10 at a side, into which the raw water flows, of the ceramic membrane module 3 to feed air as a gas restraining a fouling uniformly to an entire end surface side, into which the raw water flows (hereinafter a raw water inlet surface), of the ceramic membrane element 3a of the ceramic membrane module 3. Hereafter the configuration and an effect of the air diffuser device 10 will be explained with reference to FIGS. 2, 3A, 3B, 4A, 4B, 5A, and 5B.

Figure 2A:
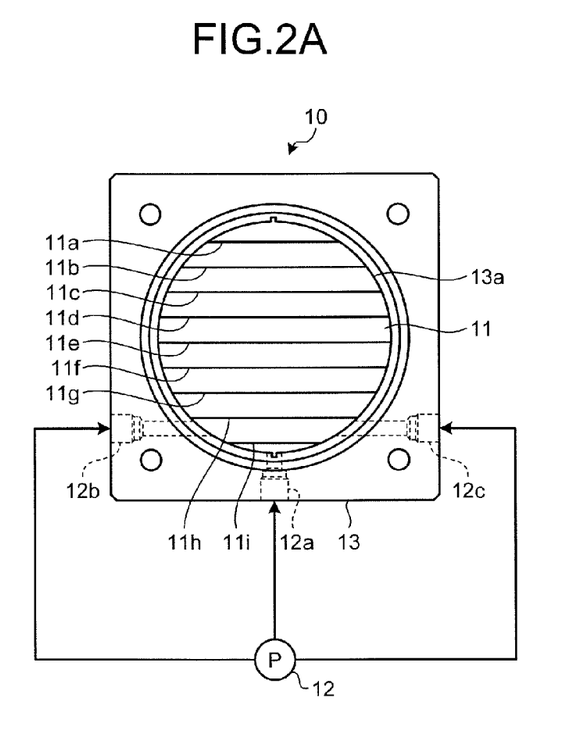
FIG. 2 is a view illustrating a configuration of a side, into which raw water flows, of an air diffuser device and a configuration of side surface of the air diffuser device according to the embodiment of the present invention.
Figure 2B:
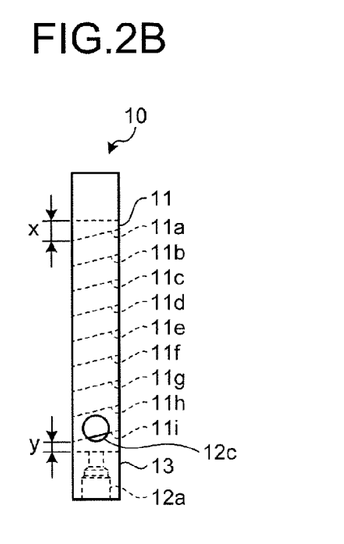

A configuration of the air diffuser device according to the embodiment of the present invention will be explained with reference to FIG. 2. FIG. 2 is a view illustrating the air diffuser device according to the embodiment of the present invention, to be more specific, configurations mainly at a side (a), into which the raw water flows, of a shelf-shaped member and a lateral side (b), into which the raw water flows, of an adapter member. Both FIGS. 3A and 4A are conceptual cross-sectional diagrams for explaining a behavior and the effect of air fed from an air-feeding port.

Figure 3A:
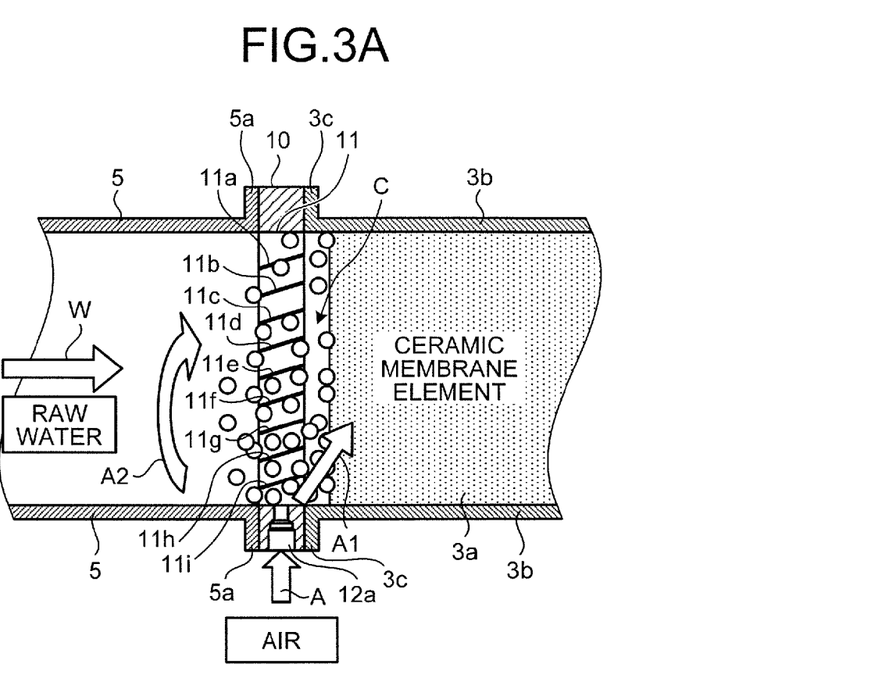
FIG. 3A is a conceptual diagram for explaining an effect of air fed from an air-feeding port.
Figure 4A:
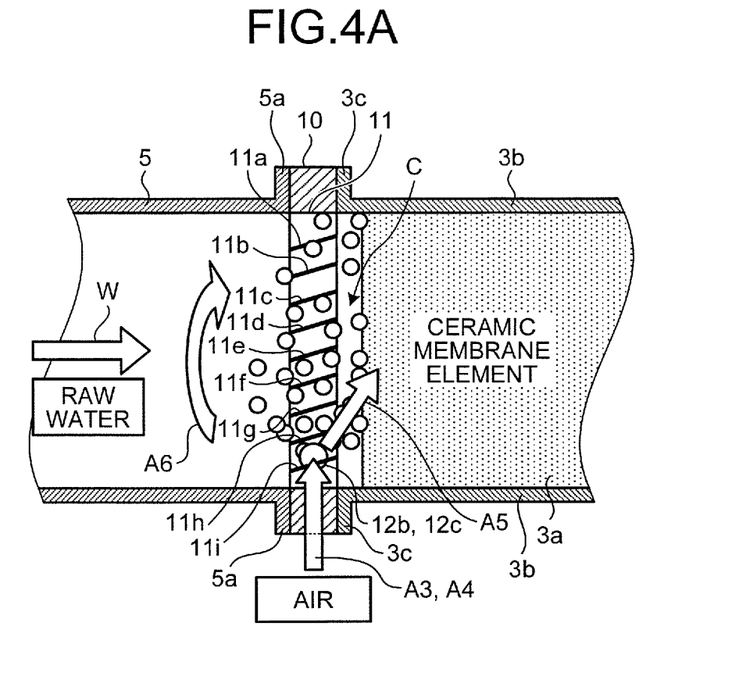
FIG. 4A is a conceptual diagram for explaining the effect of the air fed from the air-feeding port.

As shown in FIGS. 2, 3A, and 4A, the air diffuser device 10 according to the embodiment of the present invention includes a shelf-shaped member 11 and an air pump device 12. The shelf-shaped member 11 is disposed immediately adjacent to a flow path segment at an upstream of a raw water inlet surface, of the ceramic membrane element 3a, and with a predetermined distance from the raw water inlet surface, of the ceramic membrane element 3a. The air pump device 12 is a gas-feeding unit feeding a gas for washing the ceramic membrane element 3a to the raw water through air-feeding ports 12a, 12b, and 12c as gas-feeding ports provided at a bottom portion of the flow path of the shelf-shaped member 11. A sufficient space must be provided at an upstream side of the shelf-shaped member 11 in the adjacent upstream flow path segment so that air at an upstream side, blown from the gas-feeding port and dispersed by the shelf-shaped member 11 in the upstream side and a downstream side, is capable of detouring from the upstream side of the shelf-shaped member 11 to enter the flow path of the shelf-shaped member 11 smoothly and to maintain a laminar condition and avoid a turbulent flow condition. To be more specific, it is preferable that a shape and a dimension from the raw water inlet surface, of the ceramic membrane element 3a to the upstream side of the shelf-shaped member 11 is formed to coincide a transverse cross-section inside the inlet of the casing 3b continuously. The position at which the shelf-shaped member 11 is disposed in the air diffuser device 10 is determined based on a flow rate of the raw water and a rising speed of air, which will be explained later.

The shelf-shaped member 11 includes a plurality of metal-made shelf boards 11a, 11b, 11c, 11d, 11e, 11f, 11g, 11h, and 11i being formed in an approximate disk-shape in front view, covering the entire flow path of the ceramic membrane element 3a, and being disposed in a vertical direction. The shelf boards 11a to 11i incline by larger than 0° and equal to or smaller than 20° in a vertically upper direction relative to the inlet direction (horizontal direction) of the raw water from the inlet side to the outlet side of the raw water, to be more specific, for example, approximately 10°. That is, the shelf boards 11a to 11i incline within a range of larger than 0° and equal to or smaller than 20° in the vertically upper direction toward a side of the raw water inlet surface, of the ceramic membrane element 3a. In the present embodiment, a distance x between the highest position in the vertical direction, at the side into which the raw water flows, of the shelf board 11a and a periphery of a disk-shaped porous material is set to be longer than a distance y between the lowermost position in the vertical direction, at the side into which the raw water flows, of the shelf board 11i and the periphery of the disk-shaped porous material. The shelf-shaped member 11 has an adapter member 13 attached to the inlet pipe 5 and the casing 3b to be sandwiched between a flange 5a of the inlet pipe 5, as a first flange, at an end at a side of the casing 3b of the ceramic membrane element 3a and a flange 3c of the casing 3b, as a second flange, at an end at a side of the inlet pipe to configure a part of the adjacent upstream flow path segment and support the shelf boards 11a to 11i.

The adapter member 13 is made of a rectangular-shaped metal material (for example, rolled steel SS400 or the like). A round-shaped through hole 13a is formed at a center portion of the adapter member 13, and the through hole 13a configures a part of the adjacent upstream flow path segment. The adapter member 13 supports the shelf-shaped member 11 which is of a size capable of covering the raw water inlet surface, of the ceramic membrane element 3a of the ceramic membrane module 3 substantially and is approximately disk-shaped in front view. Provided at a bottom portion of the through hole 13a of the adapter member 13 are an air-feeding port 12a as a first gas-feeding port for feeding air from a bottom surface portion of the adapter member 13 to a periphery of the through hole 13a and an air-feeding path communicating thereto. Provided at both sides of the bottom portion of the through hole 13a of the adapter member 13 are air-feeding ports 12b, and 12c as a pair of second gas-feeding ports for feeding air from lower portions of two side surfaces of the adapter member 13 to the periphery of the through hole 13a and a pair of air-feeding paths communicating thereto.

Hereafter a behavior and an effect, of air, produced by the air diffuser device 10 according to the embodiment will be explained with reference to FIGS. 3A to 5B. A behavior and an effect of air fed from the air-feeding port 12a and a behavior and an effect of air fed from the air-feeding ports 12b, and 12c will be explained separately.

Figure 3B:
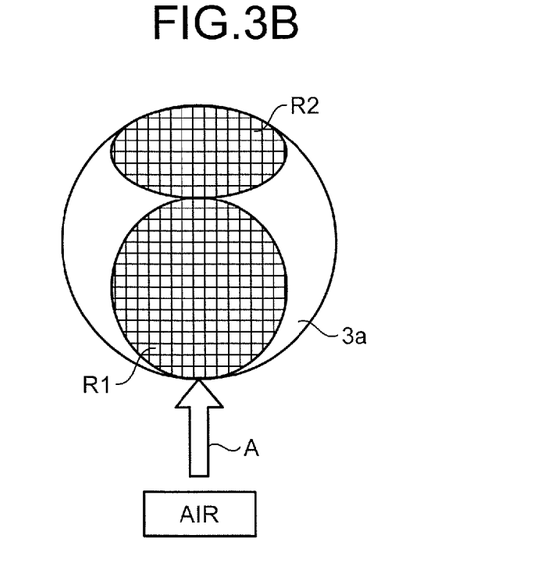
FIG. 3B is a conceptual diagram for explaining the effect of the air fed from the air-feeding port.
Figure 5A:
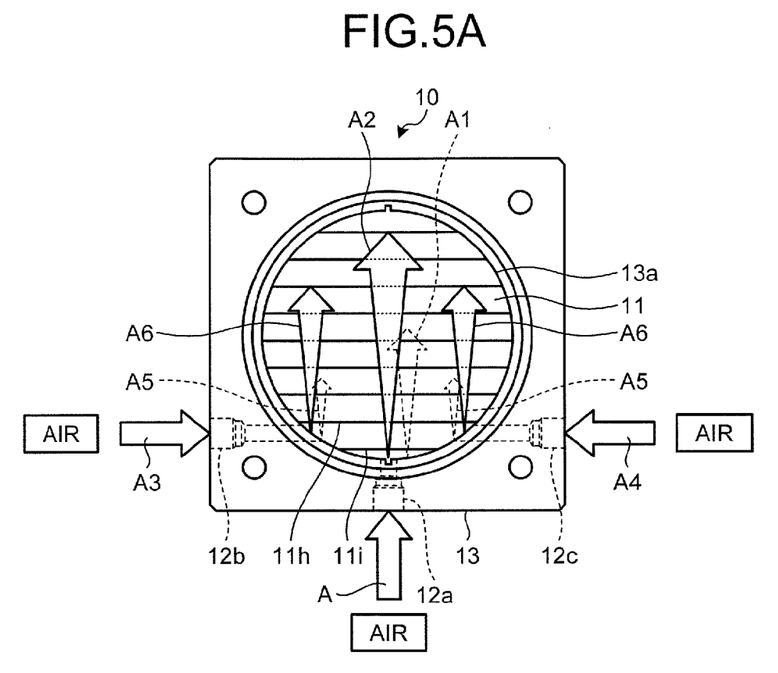
FIG. 5A is a plan view for explaining transition of air viewed from a side, into which raw water flows, of the air diffuser device.

The behavior and the effect of air fed from the air-feeding port 12a will be explained with reference to FIGS. 3A, 3B, and 5A. Both FIGS. 3A and 3B are conceptual diagrams for explaining the behavior and the effect of air fed from the air-feeding port 12a. FIG. 3A is a view from a lateral side of the ceramic membrane module 3 and FIG. 3B is a view from a side, into which the raw water flows, of the ceramic membrane module 3. FIG. 5A is a conceptual diagram illustrating air flowing from a side, into which the raw water flows, of the air diffuser device.

As shown in FIG. 3A, the ceramic membrane module 3 is configured by inserting the ceramic membrane element 3a to fit into the casing 3b to which the flange 3c as the second flange is formed at a side connected with the air diffuser device 10. The flange 5a as the first flange is formed at a side, to which the air diffuser device 10 is connected, of the inlet pipe 5 for feeding the raw water from the aeration tank 1 to the ceramic membrane module 3. The flanges 3c and 5a of the ceramic membrane module 3 and the inlet pipe 5 are fixed and connected by, for example, bolt (not shown in the drawings) or the like via the adapter member 13 of the air diffuser device 10 respectively. Hereby the direction in which the raw water is fed to the ceramic membrane module 3 is approximately in parallel with the horizontal direction, in other words, the membrane surface of the ceramic membrane element 3a is approximately in parallel with the horizontal direction. The raw water fed from the aeration tank 1 passes through the flow path of the inlet pipe 5 and the flow path of the shelf-shaped member 11 of the air diffuser device 10, and then flows in the flow path of the ceramic membrane element 3a in the approximately horizontal direction.

A predetermined clearance space C is formed between the raw water inlet surface, of the ceramic membrane element 3a and a lateral edge section of the shelf-shaped member 11 at a side to the ceramic membrane module 3. A portion of at least the flow path of the raw water inlet surface, of the ceramic membrane element 3a is in a state of being covered approximately by the shelf-shaped member 11 of the air diffuser device 10. That is, the air diffuser device 10 is disposed separately from the raw water inlet surface, with a predetermined distance in a state where the surface of the air diffuser device 10, which is in parallel with a direction, as a predetermined direction of the adapter member 13, in which the shelf boards 11a to 11i are disposed, is approximately in parallel with the raw water inlet surface, of the ceramic membrane element 3a and the raw water inlet surface, is covered with the shelf-shaped member 11. In a case where a flow rate of the raw water is equal to or less than 0.3 m/s, it is preferable that the predetermined distance is equal to or less than 11.6 mm, to be more specific, for example, 7.6 mm (in a case where the flow rate of the raw water is 0.2 m/s).

Hereby an air A is fed to the bottom portion of the through hole 13a of the adapter member 13 by an air pump device (see FIG. 2) through the air-feeding port 12a in a state where the raw water flows in the flow path of the ceramic membrane element 3a in the approximately horizontal direction through the flow path of the inlet pipe 5 and the flow path of the shelf-shaped member 11. Then the air A blown out from the air-feeding port 12a is dispersed and divided into air A1 and air A2. The air A1 is forced into the flow path of the lower region of the raw water inlet surface, of the ceramic membrane element 3a by the shelf board 11i of the shelf-shaped member 11 inclining toward the side of the raw water inlet surface, of the ceramic membrane element 3a in the vertically upper direction by a predetermined ratio through the clearance space C which is a gap between the shelf-shaped member 11 and the raw water inlet surface, of the ceramic membrane element 3a. The air A2 is forced into the flow path of the upper region of the raw water inlet surface, of the rest of the ceramic membrane element 3a to detour from the upstream side of the shelf-shaped member 11.

The predetermined ratio of the air A1 and the air A2 is determined from a viewpoint of feeding air uniformly to the entire raw water inlet surface, of the ceramic membrane element 3a (entire region not including at least the two side regions) by considering an inclination angle of the shelf board 11i at the lowermost position in the vertical direction, a volume of a space formed between the bottom portion of the flow path of the shelf-shaped member 11 and the shelf board 11i, a gap measurement, which is a width of the clearance space C, between a lateral edge section at a side of the ceramic membrane element 3a of the shelf board 11i and an inlet surface, at a raw water side, of the ceramic membrane element 3a, a flow amount of the air A, and a flow rate of the raw water. In the present embodiment, (amount of air A1)/(amount of air A2) was approximately 70/30.

A part of the air A1 is, while being prevented from rising along the inclination of the shelf board 11i, introduced into the clearance space C, and then rises in the clearance space C, thereby flows into the flow path of a central region from a lower region of the raw water inlet surface, of the ceramic membrane element 3a. To be more specific, much of the air A fed from the air-feeding port 12a is, as the air A1, forced into the flow path of the lower region of the raw water inlet surface, of the ceramic membrane element 3a because the shelf board 11i at the lowermost portion in the vertical direction is inclined toward the ceramic membrane module 3 in the vertically upper direction and the raw water flows toward the raw water inlet surface, of the ceramic membrane element 3a. Subsequently, the air A1 overflowing and not having been forced into the lower region is, while being dispersed, forced into the central region of the raw water inlet surface, of the ceramic membrane element 3a consecutively. That is, the air A1 rises in the clearance space C and is forced into the flow path (a pipe) of the ceramic membrane element 3a by an act of a flow W of the raw water. As shown in FIG. 3B, the air A1 is hereby forced into the flow path of the ceramic membrane element 3a between a relatively lower region and a central region along the vertical direction of the raw water inlet surface, of the ceramic membrane element 3a, i.e., the air-feeding region R1.

On the other hand, the air A2 at other portion flows out of a side, of the shelf-shaped member 11, into which the raw water flows, to rise in the flow path of the inlet pipe 5 rapidly, and the flow W of the raw water causes the air A2 to flow into the flow path of the shelf-shaped member 11. Then the air A2 is, while being prevented from rising, introduced into the clearance space C along the inclinations of the shelf boards 11a to 11h, and after that, the air A2 rises in the clearance space C, the air A2 flows into between the central region and the upper region of the raw water inlet surface, of the ceramic membrane element 3a. That is, as shown in FIGS. 3A and 5A, since the air A2 overflowing to the side, into which the raw water flows, of the shelf-shaped member 11 does not pass through the shelf-shaped member 11, the air A2 rises without being forced into the flow path of the ceramic membrane element 3a. Simultaneously, the air A2, while rising, enters the flow path of the shelf-shaped member 11 smoothly by the flow W of the raw water and is introduced along the inclinations of the shelf boards 11a to 11h while being prevented from rising, and rises in the clearance space C. The air A2 is hereby forced into, at first, the flow path at the central region of the raw water inlet surface, of the ceramic membrane element 3a. Subsequently, the air A2 overflowing and not having been forced into the central region is, while being dispersed, forced into the upper region of the raw water inlet surface, of the ceramic membrane element 3a consecutively.

Herein the shelf boards 11a to 11h incline in the vertically upper direction toward the side, into which the raw water flows, of the ceramic membrane element 3a so that the air A2 detoured by the shelf board 11i from an upstream side in the flow direction of the raw water in the shelf-shaped member 11 is along the inlet direction when the air A2 flows into the flow path of the shelf-shaped member 11. In a case where the shelf boards 11a to 11h have inclination of zero degree, that is, in a case where the shelf boards 11a to 11h are not inclined, the air A2 is not forced into the flow path of the ceramic membrane element 3a smoothly. The air A2 is, because of the action like this, likely to be forced into the flow path in between the central region and the relatively upper region of the raw water inlet surface, of the ceramic membrane element 3 As shown in FIG. 3B, the air A2 is hereby forced into the flow path of the ceramic membrane element 3a in between the central region and the upper region along the vertical direction of the raw water inlet surface, of the ceramic membrane element 3a, i.e., at an air-feeding region R2.

Figure 4B:
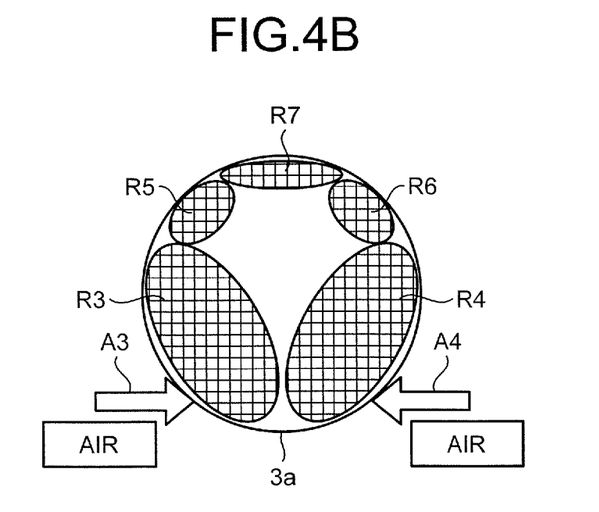
FIG. 4B is a conceptual diagram for explaining the effect of the air fed from the air-feeding port.

Hereafter, an effect of air fed from the air-feeding ports 12b, and 12c will be explained with reference to FIGS. 4A, 4B, and 5A. FIGS. 4A and 4B are conceptual diagrams for explaining a behavior and an effect of air fed from the air-feeding ports 12b, and 12c. FIG. 4A is a view from a lateral side of the ceramic membrane module 3, and FIG. 4B is a view from a side, into which the raw water flows, of the ceramic membrane module 3.

As shown in FIGS. 4A and 5A, the air pump device 12 feeds air A3 and A4 to a periphery of the through hole 13a of the adapter member 13 through the air-feeding ports 12b, and 12c in a state where the raw water flows through the inlet pipe 5 and the air diffuser device 10 in the flow path of the ceramic membrane element 3a of the ceramic membrane module 3 in the approximately horizontal direction. Then the air A3 and A4 blown out from the air-feeding ports 12b, and 12c are dispersed and divided into air A5 and air A6. The air A5 is forced into the flow path of the lower regions at two sides of the raw water inlet surface, of the ceramic membrane element 3a by the shelf board 11h, inclining in the vertically upper direction toward the side of the raw water inlet surface, of the ceramic membrane element 3a, of the shelf-shaped member 11 by a predetermined ratio through the clearance space C which is the gap between the shelf-shaped member 11 and the raw water inlet surface, of the ceramic membrane element 3a. The air A6 is forced into the flow path of the upper region of the raw water inlet surface, of the rest of the ceramic membrane element 3a so as to be detoured from an upstream side along the flow direction of the raw water in the shelf-shaped member 11.

The predetermined ratio of the air A5 and the air A6 is determined from the viewpoint of feeding air to the entire raw water inlet surface, of the ceramic membrane element 3a (at least the two side regions) uniformly by considering an inclination angle of the shelf board 11h, a volume of a space formed between the upper surface portion of the shelf board 11i and a bottom surface portion of the shelf board 11h, a gap measurement between a lateral edge section at a side of the ceramic membrane element 3a of the shelf board 11h and an inlet surface, at a raw water side, of the ceramic membrane element 3a, which is a width of the clearance space C, flow amounts of the air A3 and A4, and a flow rate of the raw water. In the present embodiment, (amount of air A5)/(amount of air A6) was approximately 70/30.

A part of the air A5 is, while being prevented from rising along the inclination of the shelf board 11i, introduced into the clearance space C, and then rises in the clearance space C, thereby flows into the flow path of two sides of a central region from a lower region at two sides of the raw water inlet surface, of the ceramic membrane element 3a. To be more specific, much of the air A fed from the air-feeding ports 12b, and 12c is, as the air A5, forced into the flow path of the lower region at the two sides of the raw water inlet surface, of the ceramic membrane element 3a because, as shown in FIGS. 4A and 5A, the shelf board 11h immediately above the air-feeding ports 12b, and 12c along the vertical direction is inclined toward the ceramic membrane module 3 in the vertically upper direction and the raw water flows toward the raw water inlet surface, of the ceramic membrane element 3a, and subsequently, the air A5 overflowing and not having been forced into the two sides of the lower region, is forced, while being dispersed, into the two sides of the central region of the raw water inlet surface, of the ceramic membrane element 3a consecutively. That is, the air A5 rises in the clearance space C at the two side portions of the shelf-shaped member 11 of the air diffuser device 10, and is forced into the flow path of the ceramic membrane element 3a by an act of the flow W of the raw water because the air A5 is blown from the air-feeding ports 12b, and 12c provided at the lateral portions of the shelf-shaped member 11 and rapidly rises, and the air is blown also from the air-feeding port 12a. As shown in FIG. 4B, the air A3 and A4 are hereby forced into the flow path of the ceramic membrane element 3a between two sides of a relatively lower region and two sides of a central region along the vertical direction of the raw water inlet surface in the vicinities of the air-feeding ports 12b, and 12c of the ceramic membrane element 3a, that is, at air-feeding regions R3 and R4.

On the other hand, the air A6 at other portion flows out of a side, into which the raw water flows, of the shelf-shaped member 11, to rise rapidly, and then flows toward the flow path of the shelf-shaped member 11 along the flow W of the raw water and flows into between the two sides of the central region and the two sides of the upper region of the raw water inlet surface, of the ceramic membrane element 3a. That is, as shown in FIGS. 4A and 5A, since the air A6 overflowing to the side, into which the raw water flows, of the shelf-shaped member 11 does not pass through the shelf-shaped member 11, the air A6 rises without being forced into the flow path of the ceramic membrane element 3a. Simultaneously, the air A6, while rising, enters the flow path of the shelf-shaped member 11 smoothly by the flow W of the raw water and is introduced along the inclinations of the shelf boards 11a to 11g while being prevented from rising, and rises in the clearance space C. The air A6 is hereby forced into, at first, the flow path at the two sides of the central region of the raw water inlet surface, of the ceramic membrane element 3a. Subsequently, the air A6 overflowing and not having been forced into the two sides of the central region is, while being dispersed, forced into the upper region of the raw water inlet surface, of the ceramic membrane element 3a consecutively.

Herein the shelf boards 11a to 11g incline toward the side of the raw water inlet surface, of the ceramic membrane element 3a in the vertically upper direction so that the air A6 detoured by the shelf board 11h from an upstream side in the flow direction of the raw water at the shelf-shaped member 11 is along the direction of the air A6 flowing into the flow path of the shelf-shaped member 11. The air A6 is, because of the action like this, likely to be forced into the flow path between the central region and the relatively upper region of the raw water inlet surface, of the ceramic membrane element 3a at the two side regions along the horizontal direction. As shown in FIG. 4B, the air A6 is hereby forced into the flow path of the ceramic membrane element 3a at two side regions along the horizontal direction of the raw water inlet surface, of the ceramic membrane element 3a between the central region and the upper region along the vertical direction, i.e., at air-feeding regions R5 to R7.

Figure 5B:
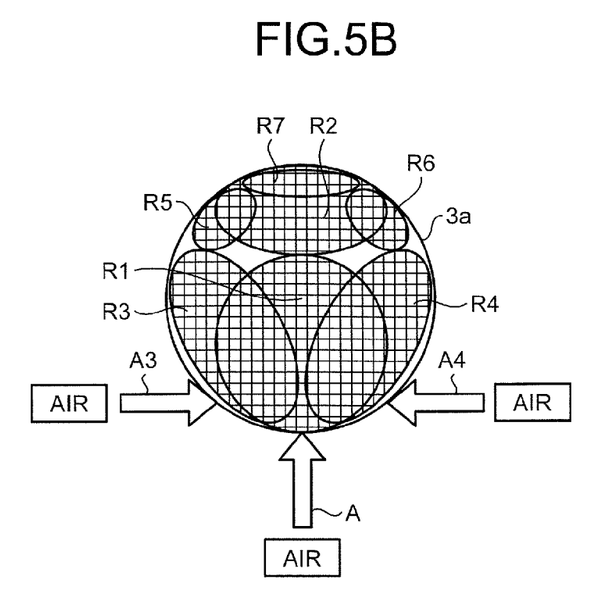
FIG. 5B is a conceptual diagram explaining the effect of air fed from all the air-feeding ports and illustrating an overlapped state of FIG. 3B and FIG. 4B.

According to the above-described embodiment of the present invention, since the shelf-shaped member 11 is provided at the adjacent upstream flow path segment of the raw water inlet surface, of the ceramic membrane element 3a and the shelf boards 11a to 11i inclining toward the side of the raw water inlet surface, of the ceramic membrane element 3a and in the vertically upper direction are provided in the flow path of the shelf-shaped member 11, and in addition, the air-feeding ports 12a, 12b, and 12c are provided at the bottom portion of the flow path of the shelf-shaped member 11, much of the air, which is likely to rise, fed from the air-feeding port 12a and much of the air fed from the air-feeding ports 12b, and 12c can be kept downward and an operative effect of making an entire air distributed uniformly is obtained, as shown in FIG. 5B, it is possible to force the air approximately uniformly into the entire raw water inlet surface, of the ceramic membrane element 3a.

The embodiment of the present invention has been explained specifically as above. The present invention is not limited to the above-described embodiment, and various modification is possible based on the technical idea of the present invention. For example, numerical values described in the above-described embodiment are mere examples, and a numerical value other than those may be used if necessary.

Although a transverse-mounted membrane filtration apparatus is applied to an aeration tank in the above-described embodiment, the present invention is not limited to the present embodiment, and the transverse-mounted membrane filtration apparatus is applicable to a case of filtering treated water in a reaction tank such as an anaerobic tank or an oxygen-free tank or the like. As described above, all of other embodiments, examples, and operational techniques carried out by an ordinary skilled person in the art based on the present embodiment are included within a range of the present invention.

The transverse-mounted membrane filtration apparatus according to the present invention is capable of feeding air uniformly to the entire end surface of the membrane element of the membrane module disposed in the transverse-mounted membrane filtration apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A transverse-mounted membrane filtration apparatus comprising:
a membrane module;
an inlet pipe through which a raw water flows to the membrane module, the raw water flowing in a flow path of a membrane element of the membrane module in an approximately horizontal direction; and
an air diffuser device including a shelf-shaped member and a gas-feeding unit, the shelf-shaped member including a plurality of shelf boards being arranged in a flow path segment immediately adjacent to an upstream end surface of the membrane module, such that the shelf-shaped member is disposed with a gap of a predetermined distance from an end surface of the membrane element and covering an entire flow path of the membrane element along a vertical direction, the gas-feeding unit feeding a gas to the raw water for washing the membrane element through a gas-feeding port provided at a bottom portion of a flow path of the shelf-shaped member, wherein a shelf board at a lowermost position of the shelf-shaped member is inclined toward a side of the end surface of the membrane element in a vertically upper direction so that the shelf board at the lowermost position of the shelf-shaped member along a vertical direction disperses the gas blown out from the gas-feeding port into a predetermined ratio of a first gas and a second gas, the first gas is forced into a flow path of a lower region of the end surface of the membrane element through the gap between the shelf-shaped member and the end surface of the membrane element and the second gas is detoured from an upstream side of the shelf-shaped member and forced into a flow path of an upper region of the end surface of the membrane element, the gas-feeding port is provided at a position below the shelf board at the lowermost position in the vertical direction, such that the position of the gas-feeding port is overlapped with the shelf board at the lowermost position in the vertical direction, and the gas-feeding unit is configured to blow out the gas towards a vertically lower surface of the shelf board at the lowermost position from the gas-feeding port.

2. The transverse-mounted membrane filtration apparatus according to claim 1, wherein the plurality of shelf boards of the shelf-shaped member is inclined toward the side of the end surface of the membrane element in the vertically upper direction so that each of the plurality of shelf boards above the shelf board at the lowermost position of the shelf-shaped member is along an inlet direction of the second gas, when flowing into the flow path of the shelf-shaped member, to be detoured by the shelf board at the lowermost position from the upstream side of a flow direction of the raw water at the shelf-shaped member.

3. The transverse-mounted membrane filtration apparatus according to claim 1, wherein the gas-feeding unit further includes a pair of gas-feeding ports provided at two sides of the bottom portion of the flow path of the shelf-shaped member and between two of the plurality of vertically adjacent shelf boards and is configured to be capable of feeding a third gas and a fourth gas for washing the membrane element through the pair of the gas-feeding ports, so that an upper one of the plurality of shelf boards arranged adjacent to another in the vertical direction of the shelf-shaped member is inclined to the side of the end surface of the membrane element in the vertically upper direction so that the upper one of the plurality of shelf boards disperses the third gas and the fourth gas blown out from the pair of gas-feeding ports into a predetermined ratio of a fifth gas and a sixth gas, the fifth gas is forced into two sides of the lower region of the end surface of the membrane element through the gap between the shelf-shaped member and the end surface of the membrane element and the sixth gas is detoured from the upstream side along the flow direction of the raw water at the shelf-shaped member and forced into the flow path at two sides of the upper region of the end surface of the membrane element.

4. The transverse-mounted membrane filtration apparatus according to claim 1, wherein the inlet pipe includes a first flange at an end portion of the inlet pipe, at a side of a casing of the membrane element; the casing includes a second flange at an end portion of the casing, at a side of the inlet pipe; the air diffuser device includes an adapter member which configures a part of the adjacent upstream flow path segment and supports the plurality of the shelf boards by being attached to the inlet pipe and the casing so as to be sandwiched between the first flange and the second flange; and the gas-feeding port and a gas-feeding path communicating with the gas-feeding port are provided to the adapter member.

5. The transverse-mounted membrane filtration apparatus according to claim 1, wherein the shelf-shaped member has an opening and the plurality of shelf boards extend horizontally across the entirety of the opening in the shelf-shaped member, such that each shelf board of the plurality of shelf boards is inclined toward the end surface of the membrane element in a vertically upper direction.

* * * * *